Figure 1:
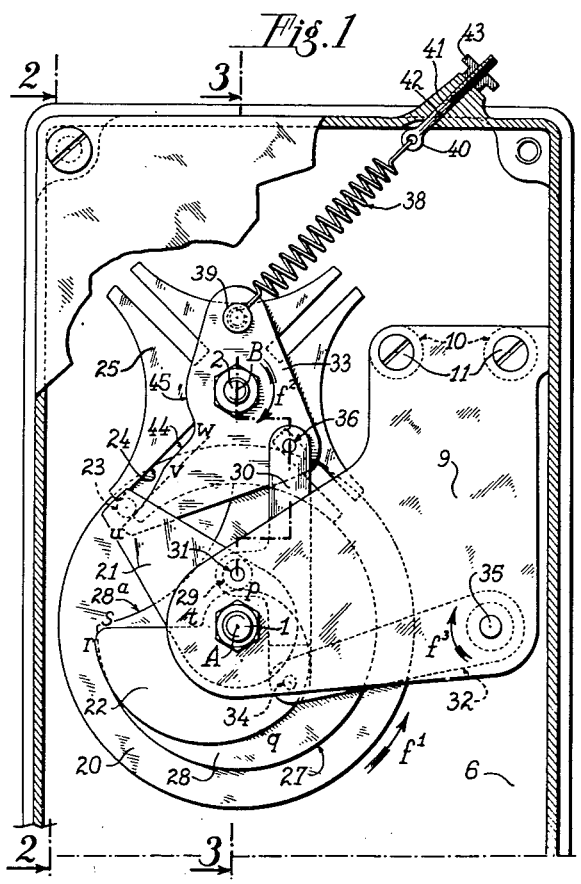

June 26, 1956  G. A. MIESCH  2,751,792
DRIVE MECHANISM

Filed Dec. 2, 1953  5 Sheets-Sheet 1

Inventor:
Georges André Miesch
by: J. Delatter Seguy
Attorney

June 26, 1956

G. A. MIESCH 2,751,792

DRIVE MECHANISM

Filed Dec. 2, 1953

5 Sheets-Sheet 2

Inventor:
Georges André Miesch
by: J. Delattre-Seguy
Attorney

Inventor:
Georges André Miesch
by: J. Delatte Seguy
Attorney

June 26, 1956  G. A. MIESCH  2,751,792
DRIVE MECHANISM

Filed Dec. 2, 1953  5 Sheets-Sheet 4

Inventor:
Georges André Miesch
by: J. Delattre-Seguy
Attorney

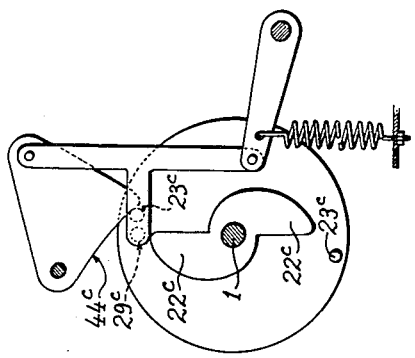
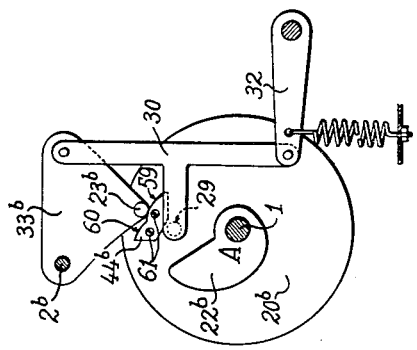
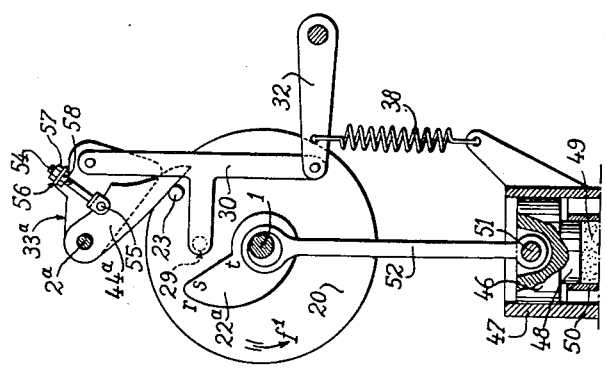

United States Patent Office 2,751,792
Patented June 26, 1956

2,751,792

DRIVE MECHANISM

Georges André Miesch, Paris, France, assignor to Societe d'Exploitation des Procedes Serix, Paris, France, a French body corporate Application December 2, 1953, Serial No. 395,696

Claims priority, application France December 6, 1952

23 Claims. (Cl. 74—436)

The present invention relates to means for driving a device which is of such kind that the motive power consumed in driving the driven member undergoes a cyclic variation that is the same for each cycle, this power being small in magnitude, even zero, for a first part in the cycle and passing through a peak value, which might be high, during a second part of this cycle.

This cyclic variation in the power consumed occurs in certain devices which are driven with an intermittent rotary motion and in particular in those devices driven by means of a Maltese cross interposed between the driven device and a rotative driving shaft to which a constant driving torque is applied.

Such devices are usually driven by a motor which develops in the course of one cycle a constant driving or motive power which is less than said peak power and greater than the power consumed during the first part of the cycle corresponding to the low power consumption of the device, the energy necessary for passing through the peak power consumption part of the cycle being furnished by a device which is connected to the driving member or a motor output shaft and which stores energy during the period of low power consumption and restores it at the required moment. Generally a fly-wheel is used for this purpose, but if the driven device must be capable of stopping suddenly, a fly-wheel necessitates the provision of a clutch between the driven device and the driving mechanism. This results in loss of energy owing to the fact that the fly-wheel, if uncoupled, is continued to be driven alone or is braked by braking means.

It has already been proposed to overcome the disadvantages of the fly-wheel by means of other energy storing or accumulating devices in more or less complicated elastic systems, but hitherto without success. Thus, to take an example, the Maltese cross arrangement is still employed in association with a fly-wheel where low power drives are concerned, as for example in the cinema industry in drives for conventional 16 mm. films of 35 mm. size. However, the Maltese cross arrangement has been abandoned in cases where the power consumed is relatively high as for example in the case of drives for large films such as a 35 cm. X-ray film, or for printing machines, etc.

The invention has for its object to provide an improved driving mechanism of the type that cyclically accumulates or stores energy and is arranged so that the variable power furnished thereby to the driven device passes through a peak value in the course of each cycle, this mechanism permitting the necessary driving or input energy to be spread over the whole of the cycle and furthermore rendering said driving energy adaptable to the constant motive power furnished by a driving motor.

This improved mechanism comprises in combination: a driving rotative member operatively connected to said motor in such manner that this rotative member is driven with a uniform motion and is capable of transmitting constant driving torque, a driven member operatively connected to the device to be driven, mechanical connecting means between these driving and driven members, energy storing means movable between a loaded position and an unloaded position, and two pairs of conjugate mechanical contact members, in each pair of the latter one contact member being provided on the driving member and the other contact member on the energy storing means in such positions that the contact members of one of the pairs of contact members enter into contact only when the contact members of the other pair cease to be in contact, and these pairs of contact members being so adapted that at each instant they permit an exchange of power between the driving member and the energy storing means in one direction in the case of one pair of contact members and in the other direction in the case of the other pair, these power exchanges corresponding respectively to the excess and the deficiency of the driving power relative to the power consumed at the considered instant.

As will be understood, since two pairs of contact members, are provided it is very easy to adapt and arrange each pair to suit the corresponding curve of the excess power to be stored or restored whereas it would be much more difficult and sometimes even impossible if only one set of contact members were used for both storing and restoring the energy.

Further, each pair of contact members may be arranged in such manner that the transfer of energy from the driving member to the storing means and vice versa may be accomplished with maximum efficiency. This would not be possible with a single pair of members, at least for one direction of the energy transfer.

The invention has for further object to provide machines including the above-described drive mechanism.

Figure 2:
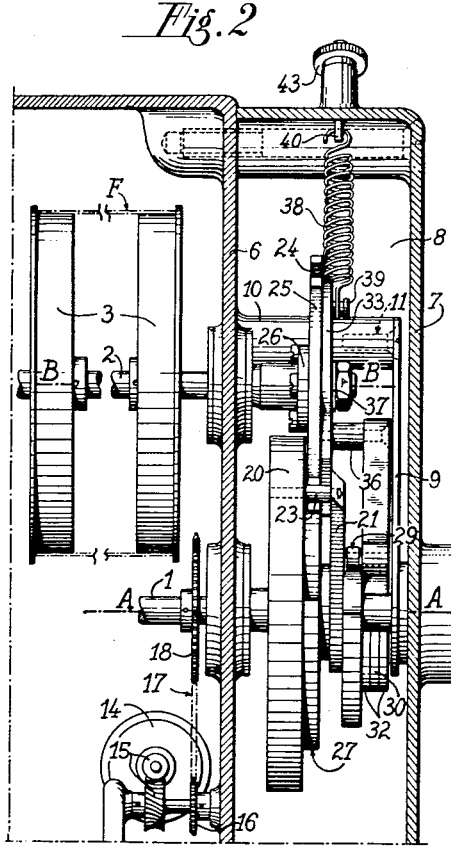
Figure 3:
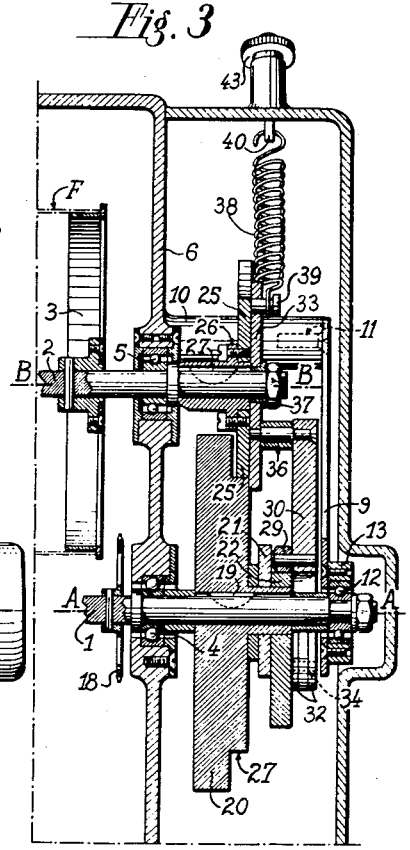
Figure 4:
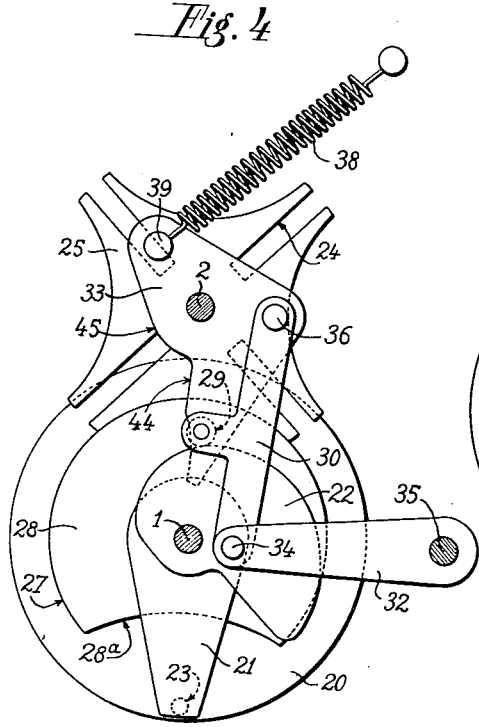
Figure 8:
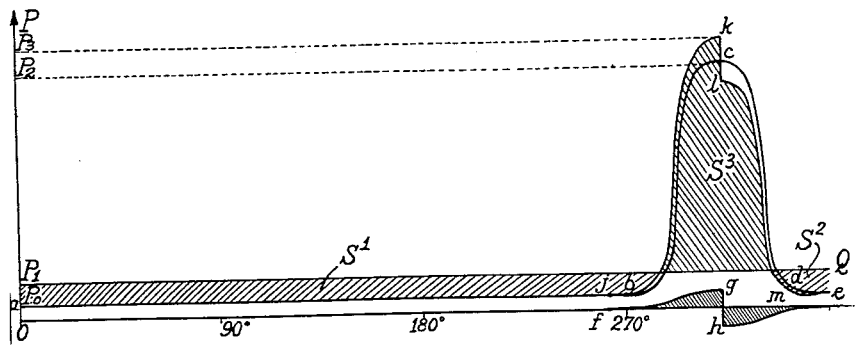

Other features and advantages of the invention will be apparent from the ensuing illustrative description with reference to the accompanying drawings given merely by way of example and in which:

Fig. 1 is an elevational view with a part cut-away, of a drive mechanism according to the invention comprising connecting means of the Maltese cross type between a driving shaft and a driven shaft this mechanism being shown in the position corresponding to the moment at which the rotation of the Maltese cross is stopped, Figs. 2 and 3 are transverse sectional views on lines 2—2 and 3—3 respectively of Fig. 1, Figs. 4 to 7 are diagrammatic views, similar to that in Fig. 1, showing the drive mechanism in other positions, Fig. 8 is a diagram of the power curves relating to the power supplied and the power consumed, Fig. 9 is a diagrammatic illustration of the mechanism according to the invention adapted to drive the moving part of a press, and Figs. 10 and 11 are diagrammatic views of two modifications of the mechanism according to the invention.

According to the embodiment shown in Figs. 1 to 8, the drive mechanism is disposed between a driving shaft 1 having an axis AA, and a driven shaft 2 having an axis BB parallel to the axis AA. The driving shaft 1 rotates with a continuous motion and develops a constant torque. The shaft 2 only turns through a fraction of a rotation, less than 90°, in each operational cycle of the mechanism which corresponds to one complete rotation of the shaft 1.

The driven shaft 2 carries, for example, two flange members 3. These flange members are disposed inside an X-ray photographic apparatus and drive a large-size film F, for example 35 cm. wide, which requires when it is driven or shifted a relatively high motive power. The shafts 1 and 2 are journalled by anti-friction bearings 4 and 5 in a side member or plate 6 of the machine. Between this side member and a removable cover 7, is a chamber 8 in which the mechanism according to the invention is disposed.

This mechanism is housed between the side member 6 and a plate 9 parallel to the member 6 and connected to the latter by spacer members 10 and screws or bolts 11.

The shaft 1, which is journalled not only in the side member 6 but also in a second anti-friction bearing 12 whose cage 13 is connected to the plate 9, is rotated in the direction of arrow $f^1$ (Fig. 1) by a source of constant power, for example an electric motor 14, through speed reduction means 15, a sprocket 16, a chain 17 and another sprocket 18 keyed to the shaft 1.

The power transmitted to the shaft 1 by the motor 14 has a constant value $P_1$ (see the diagram in Fig. 8 in which are plotted, along the axis OP, the rotation of the shaft in degrees and, along the axis OX, the various magnitudes of power). The value of this power $P_1$ will be defined hereinafter. On this graph has been shown along $a\ b\ c\ d\ e$ the curve of the power consumed by the machine, i. e. at $ab$ the very small amount of power consumed by friction in the driving mechanism and at $b\ c\ d$ the power consumed by the unit comprising the device to be driven. This power $b\ c\ d$ passes through a maximum or peak $P_2$ which is clearly greater than $P_1$. Owing to the transmitting mechanism which will now be described, the power $P_1$ is however sufficient to drive the aforementioned unit.

This mechanism, which comprises the members included between the driving shaft 1 and the driven shaft 2, also includes a connecting device of the Maltese cross type. Keyed at 19 to the shaft 1 (Fig. 3) is a plate 20 on which are fixed by screws or other means an arm 21 and a cam 22. The plate 20 and the arm 21 carry a contact member, here shown provided with a roller 23, for driving the Maltese cross. This roller is adapted to engage, once for each complete rotation of the driving shaft, one of the four radial slots 24 of a Maltese cross 25. The latter is connected to a hub 26 keyed at 27 to the driven shaft 2. The Maltese cross device is completed by a stop plate of usual type constituted by a circular boss 28 integral with the plate 20 and notched at $28^a$ to allow the rotation of the Maltese cross at the desired moment.

The peripheral edge of the cam 22 comprises at $p\ q\ r$ a portion which corresponds to 270° of cam action, that is to an equivalent rotation of the shaft 1. This portion is substantially in the shape of a spiral of Archimedes and is followed after a short radiused portion $r\ s$ by a radially extending portion $s\ t$ connected by a small radiused portion to a circular portion $t\ p$ which corresponds to 90° of cam action. The actual rise of the spiral portion will be defined hereinafter. A contact member or roller 29 is adapted to roll round this cam. The cam 22 and the roller 29 constitute a first pair of mechanical contact members, which are adapted to ensure the accumulation or storage of energy in an energy storer which will now be described.

The energy storer comprises a connecting rod 30, to which is fixed the journal or spindle 31 of the roller 29, and two levers one of which is an auxiliary lever 32 and the other a main lever 33. The connecting rod 30 is pivoted, firstly at 34 to the lever 32 which is itself pivoted at 35 to the side member 6 and the plate 9 and, secondly, at 36 to the main lever 33 which is mounted through a collar 37 on the driven shaft 2 and is freely rotative. The journals 34, 35 and 36 are parallel to the axes AA and BB of the shafts 1 and 2. In the position shown in Fig. 1, which will be considered as the starting position in the operational cycle of the mechanism, the roller 23 is on the point of leaving the Maltese cross and the journals 34 and 36 lie in a plane parallel to the plane 3—3 (see Fig. 1) which includes the axes AA and BB.

The lever 33 is caused to rotate round the shaft 2 in the direction of arrow $f^2$ (Fig. 1) by a spring 38 connected at 39 to this lever and engaged in the eye 40 of a bolt 41 which is adapted to slide in a hole 42 provided in the casing and on which is screwed, outside this casing, an adjusting nut 43 whereby the tension of the spring may be adjusted.

The main lever 33 is substantially in the form of a triangular plate freely mounted on the shaft 2 in the region of its centre. The connecting rod 30 is pivoted at 36, adjacent one of the apexes of the triangle, and the spring 38 is connected at 39, adjacent one of the other apexes. One of the edges 44, which starts at the third apex of the triangle has a cam face $u\ v\ w$. This edge is then prolonged by a portion 45 which may be of any shape and which extends round the shaft 2 at a sufficient distance from the latter to ensure that the lever is firmly supported.

The edge 44 is formed on the lever 33 in such manner as to cooperate with the roller 23 for the whole of the period during which this roller is engaged in one of the radial slots 24 of the Maltese cross, i. e., for the part of the cycle in which the driving shaft 1 turns through 90°. This part of the cycle is comprised between the positions $f$ and $i$ shown in the graph (Fig. 8) and which correspond to the rotational positions of the shaft 1 after it has turned through 270° and 360° respectively, starting from its position shown in Fig. 1, which represents the start of one cycle.

The roller 23 and the lever 33 constitute a second pair of conjugate mechanical contact members which are adapted to restore during the part $f\ i$ of the cycle the energy stored during the rest of the cycle $o\ f$ (see Fig. 8).

The cam 44 comprises a portion $u\ v$ which is an arc of a circle the radius of which is equal to the distance between the axis AA and the point of the follower roller 23 which is the most remote from this axis. The portion $v\ w$ of the cam is rectilinear and extends radially from the axis BB of the shaft 2.

The mechanism operates in the following manner:

In the position shown in Fig. 1, one cycle has just finished and a new one is about to commence. The driving shaft 1 rotates in the direction of arrow $f^1$ the plate 20, the stop plate boss 28, the cam 22, the lever 21 and the roller 23. As the shaft 1 rotates, the cam 22 progressively urges the roller 31 away from the axis AA and thus causes the lever 32 to pivot in the direction of arrow $f^3$ and the lever 33 to pivot in the opposite direction to arrow $f^2$ (Fig. 1). As the lever 33 pivots the spring 38 is put under tension. (Compare the positions shown in Figs. 1 and 4; the latter shows the intermediate positions of the members during the part of the cycle in which the spring 38 is put under tension, that is when energy is being stored.)

The cam 22 thus enables excess power to be stored. By suitably selecting the tension of the spring 38, it can be arranged that the energy stored be equal to $P_1-P_0$, where $P_0$ is the constant and very small power consumed by friction in the mechanism.

Figure 5:
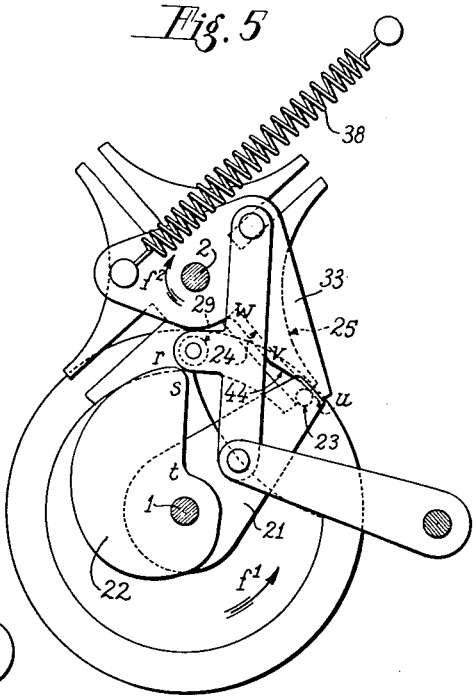

Energy is stored until the position shown in Fig. 5 is reached. This position corresponds to the instant when the cam 22 has just brought its radiused portion $r\ s$ under the roller 29 and the roller 23 has just engaged one of the radial slots 24 of the Maltese cross 25. For the position shown in Fig. 5, the lever 33 is in one of its dead centre or extreme positions corresponding to the maximum storage of energy in the spring 38 and this lever presents the arced portion $u\ v$ of its cam edge 44 just above the roller 23. The rotary motion of the driving shaft 1 continues and the cam 22 leaves the roller 29 owing to the sudden drop or step $s\ t$. However, the spring 38 cannot be suddenly released and thus restore in one go the whole of the stored energy because the lever 33 is temporarily held stationary by the engagement of the arced portion $u\ v$ of the cam edge 44 on the roller 23.

Figure 6:
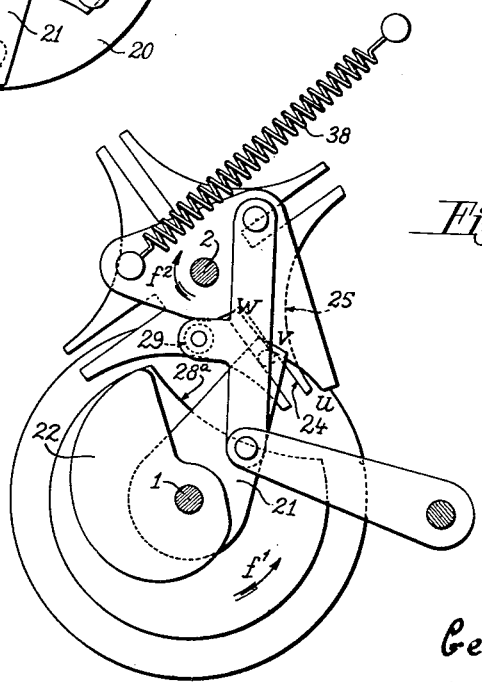
Figure 7:
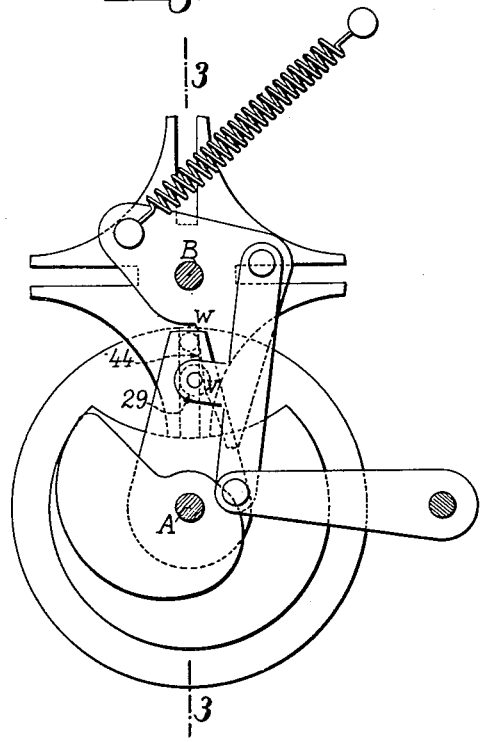

The position shown in Fig. 5 corresponds to the point $f$ (Fig. 8) of the cycle and from this moment until the mechanism assumes the position shown in Fig. 6 the lever 33 remains stationary for the aforementioned reason, whereas the roller 23, which is engaged in one of the slots 24 of the Maltese cross, commences to rotate the latter in the direction of arrow $f^2$ without any restoration of the stored energy, which would be of no use at this moment since, owing to play in the various members, the load to overcome is not really encountered until a little later. This delay corresponds to the part $jb$ of the curve of the consumed power (Fig. 8). In this way the Maltese cross is gradually set in motion without any sudden jarring.

When the rotative unit integral with the shaft 1 reaches the position shown in Fig. 6 corresponding to the point $b$ on the curve (Fig. 8), the roller 23 reaches at $v$ the rectilinear part $v\,w$ of the cam edge 44 and the actual drive of the film F commences. The lever 33 transmits through the edge $w\,v$ the energy stored in the spring 38 to the roller 23 and the energy thus restored is added to the energy $P_1$ which is continuously provided by the shaft 1. Provided that the sum of these energies is sufficient, the operation continues and the mechanism moves from the position shown in Fig. 6 to that shown in Fig. 1. In the intermediate position shown in Fig. 7, the mechanism is in fully effective operation. The portion $v\,w$ of the cam then occupies a position which substantially coincides with the plane including the axes AA and BB so that the direction of the force transmitted by this cam to the roller 23 is substantially tangential relative to the shaft 1. The energy storer has at this point maximum effect on the drive and remains very effective until the position shown in Fig. 1, corresponding to the end of the cycle, is attained. In this position the restoration of the energy ceases. From the position shown in Fig. 7 to that shown in Fig. 1, the radial portion $v\,w$ of the cam 44 remains parallel to the slot 24 of the Maltese cross and therefore engages the roller 23 under the most advantageous conditions.

Reference will now be had to the graph shown in Fig. 8 for a closer examination of the characteristic power curves of the mechanism.

It will be recalled that on this graph the portion $a\,b\,c\,d\,e$ represents the variation in the power consumed in driving the shaft 2 (taking into account friction and efficiency of the mechanism). This power, which is constant and very small in magnitude from $a$ to $j$, passes through a maximum or peak at $c$ due to the fact that the film F is driven by the Maltese cross, whose displacement commences at $f$ and ceases at the end of the cycle at $i$.

Now, it is known that the velocity of the Maltese cross increases first slowly and then more rapidly and passes through a maximum half way through its travel and thereafter decreases symmetrically until its position corresponding to point $o$ or $i$ in the graph is reached. Thus it consumes a certain amount of energy due to inertia during the first half of its travel, then restores this energy during the following half of its travel. The curve of the power consumed and then restored by the Maltese cross is shown in the graph at $f\,g\,h\,i$. This energy loss and gain must be added algebraically to the power curve $a\,b\,c\,d\,e$ to give at $a\,j\,k\,l\,m\,e$ the curve of the effective power consumed by the entire mechanism due to friction and to driving the Maltese cross and the film F.

In the graph the ordinates have been arbitrarily chosen and are merely illustrative, there being no intention to show the exact power relations. Hence, the motor 14 is shown to have a power $P_1$ so that the line $P_1Q$, which is parallel to the axis OX, defines with the power curve $a\,j\,k\,l\,m\,e$ two areas $S^1$ and $S^2$, situated below, and an area $S^3$, situated above this line, so that $S^1+S^2=S^3$.

The areas $S^1$ and $S^2$ correspond to the parts of the cycle during which the power $P_1$ is in excess of that required to drive the mechanism. The area $S^3$ corresponds to the other part of the cycle during which the power $P_1$ is insufficient and thus represents the extra work required to rotate the Maltese cross.

The spring 38 is of such type as to be capable of storing the excess energy $S^1+S^2$, i. e. its increase in length is substantially proportional to its load.

Thus the restored energy provides the shaft 1 with sufficient torque to compensate the extra energy consumed in driving the Maltese cross and the driven device (represented by the area $S^3$ in the graph). Further, the power of the motor is fully utilized and the machine equipped with the drive mechanism according to the invention operates at maximum efficiency.

It is clear that, owing to the fact that the functions of storing and restoring energy are performed by two separate mechanisms, namely the mechanical contact members 22, 29 and 23, 24 respectively, it can be arranged that the storing of energy occur during the part of the cycle in which the motor furnishes excess energy and that this energy be exactly equal to the latter. Further, it is possible to arrange that, during the part of the cycle in which the energy storer in restoring energy, the energy restored corresponds exactly to the extra energy required. In other words, it is possible, by giving suitable profiles to the cam 22 and the cam 44, to adapt the drive mechanism to any curve of power consumed, such as the curve $a\,j\,k\,l\,m\,e$ shown in Fig. 8. This would be much more difficult, if not impossible, if, in order to simplify the mechanism, it were attempted to restore the energy stored in the spring 38 by reversing the functions of the cam 22 and the roller 29, that is by returning the stored energy to the shaft 1 through the direct support of the roller 29 on the portion $s\,t$ of the cam 22.

It will be observed that the connecting rod 30 and the levers 32 and 33 are advantageously given such distances between pivot centres that the axis of the roller 29 always remains substantially in the plane 3—3 (Fig. 1) and that, for the mid-way position of the lever 32, the plane containing the axes of the pivots 34 and 35 also intersects the axis AA and is perpendicular to the plane 3—3 containing the axes AA and BB.

In Fig. 9 there is shown another application of the drive mechanism according to the invention, the mechanism being employed in actuating a slide 46 of a press. The slide which is slidable in slideways 47, carries a ram 48 which is adapted to compress at the end of its stroke for example sand 49 in a mould 50. Pivoted to this slide 46 at 51 is a connecting rod 52 which is pivoted at its other end to an eccentric plate 53 keyed to the driving shaft 1. The essential components of the mechanism according to the invention are to be found in this arrangement, i. e. the plate 20 integral with the shaft 1, the cam $22^a$ and its cooperating roller 29 and the energy storing means comprising the connecting rod 30, the auxiliary lever 32 and the main lever $33^a$ which is freely pivotable about a fixed journal $2^a$. The lever $33^a$ carries a cam $44^a$ which is adapted to cooperate with a contact member or pin 23, provided on the plate 20, as soon as the cam $22^a$ positions its spiral portion in front of the roller 29. The cam $44^a$ is adjustable in position on the lever $33^a$. It is pivotally mounted on the journal $2^a$ and is connected to a bolt 54 which is pivoted at 55 to the cam $44^a$ and loosely extends through a lug 56 formed on the lever $33^a$. Two nuts 57 and 58 enable the bolt 54 to be locked in the desired position relative to this lug.

Clearly, in this application of the invention the magnitude of the power consumed is small during the rise of the slide 46, which constitutes the driven member, zero or even negative during the downward travel of the slide before the ram 48 enters into contact with the material 49, and then increases rapidly until the slide attains its dead centre position, that is during the period in which the material is compressed. The angular relationship between the two pairs of contact members $22^a$, 29 and 23, $44^a$ must therefore be so chosen that the last-mentioned pair of contact members restore the stored energy during that part of the rotation of the shaft 1 which corresponds to the compression of the material 49. In this application the ram is forced downwards by the mechanism immediately after the period during which the energy storer is loaded and the surplus energy is restored immediately after it has been stored. Hence, the cam 44ª does not include the arced portion *uv* provided on the lever 33 in the foregoing example, which, it will be recalled, served to delay the restoration of energy until the propitious moment. Further, as the cam 44ª is adjustable in position on the lever 33ª, it is possible to modify its action on the shaft 1 to suit the torque required, for example as a function of the force required to compress the material 49.

In this example, moreover, the energy consumed outside the actual working period is not constant and results in a variable excess of motive power. The rise of the cam 23ª should not therefore be exactly that of a spiral of Archimedes and is actually a function of the excess motive power. Hence, the rise is more rapid in the part of the cam which passes the roller 29 during the free downward travel of the slide 46.

In Fig. 10, there is shown a second modification in which the relative positions of the two contact members of the pair relating to the restoration of energy are reversed. The cam 44ᵇ is carried by the plate 20ᵇ and the roller 23ᵇ is carried by the lever 33ᵇ which is pivotally mounted on the journal 2ᵇ. The cam 44ᵇ may, as in the first example, comprise an arced portion 59, which is concentric with the shaft 1, and an active portion 60. This cam may be constituted by a boss formed on the plate 20ᵇ or may be a separate member fixed to the latter by screws 61 which permit the cam to be adjusted in position. The other contact members are substantialy identical to those described in the first example.

In all the foregoing examples the operational cycle corresponds to one complete rotation of the driving shaft 1. However, this is not essential to the arrangement. Thus in Fig. 11 is shown a diagrammatic and partial view of a modification of the invention in which one cycle corresponds to a 180° rotation of the shaft 1, i. e. the latter drives a device which operates twice in one complete rotation of the shaft 1. In this case there are provided two cams 22ᶜ diametrally opposed and two rollers 23ᶜ also diametrally opposed. The roller 29ᶜ follows each cam 22ᶜ in turn and the cam edge 44ᶜ is pivoted by each of the two rollers 23ᶜ in turn.

Although specific embodiments of the invention have been described hereinbefore, it is to be understood that many changes and modifications may be made therein without departing from the spirit of the invention, or the scope of the appended claims.

Thus the roller 29 may be carried by the lever 32 instead of the connecting rod 30. The energy storing means may be of a kind different to that described. The elastic means for the energy storing means may, instead of being a spring, comprise a set of elastic members such as yieldable washers, or comprise an air bellows.

Having now described my invention what I claim as new and desire to secure by Letters Patent is:

1. Drive mechanism, which stores energy in the course of an operational cycle, for connecting to a motor furnishing a constant motive power a driven device that consumes power which varies in magnitude and passes, in the course of said cycle, through a peak value that is greater than said motive power, this drive mechanism comprising in combination: a rotative driving member operatively connected to said motor so as to be driven thereby with a uniform motion and be capable of transmitting a constant driving torque, a driven member for connection to the device to drive, a mechanical connecting device between the driving and driven members, energy storing means movable between a loaded position and an unloaded position, and two pairs of conjugate mechanical contact members in each pair of which one contact member is provided on said driving member and the other on the energy storing means in such positions that for a given direction of rotation of said driving member each pair of contact members enter into contact in succession, the contact members of one of the pairs of contact members entering into contact only when the contact members of the other pair cease to be in contact, and these pairs of contact members being so adapted and arranged that at each instant they permit for said direction of rotation of said driving member an exchange of power between said driving member and the energy storing means, one of said pairs of contact members permitting said exchange of power in a direction from said energy storing means to said driving member and the other pair of contact members permitting said exchange of power in a direction from said driving member to said energy storing means, these exchanges of power corresponding respectively to the excess and deficiency of the motive power relative to the power consumed at each instant.

2. Drive mechanism as claimed in claim 1, wherein at least one of said mechanical contact members is adjustable in position on the element of the mechanism on which it is provided.

3. Drive mechanism as claimed in claim 1, wherein at least one of said mechanical contact members is detachable from the element of the mechanism on which it is provided.

4. Drive mechanism as claimed in claim 1, wherein each pair of mechanical contact members comprises a cam and a conjugate roller.

5. Drive mechanism as claimed in claim 4, wherein the cam which pertains to the exchange of power from the driving member to the energy storing means is shaped as a spiral of Archimedes and is combined with the energy storing means so that the energy stored is substantially proportional to its displacement.

6. Drive mechanism as claimed in claim 4, wherein the cam pertaining to the exchange of power from the energy storing means to the driving member comprises a portion in the shape of an arc of a circle that is concentric with said driving member at the moment when this portion enters into contact with its conjugate contact member, whereby the restoration of the stored energy is delayed and thus enables the rotation of the driven member to be started smoothly and without jarring.

7. Drive mechanism as claimed in claim 1, wherein said driving member rotates through 360° in said cycle and carries only two contact members each one of which constitutes one of the contact members of each pair of mechanical contact members.

8. Drive mechanism as claimed in claim 1, wherein said driving member rotates through $$\frac{360°}{n}$$

in said cycle and carries two sets of $n$ contact members which are identical in each set and are disposed about the axis of rotation of said driving member and angularly spaced apart $$\frac{360°}{n}$$

relative to said axis, the contact members in each set cooperating in turn once every cycle with a single conjugate contact member provided on the energy storing means.

9. Drive mechanism, which stores energy in the course of an operational cycle, for connecting to a motor furnishing a constant motive power a driven device that consumes power which varies in magnitude and passes, in the course of said cycle, through a peak value that is greater than said motive power, this drive mechanism comprising in combination: a rotative driving member operatively connected to said motor so that this driving member is driven with a uniform motion and is capable of transmitting a constant driving torque; a driven member operatively connected to the device to be driven, a mechanical connecting device between these driving and driven members; energy storing means movable between a loaded position and an unloaded position, said energy storing means comprising three elements including two levers which are pivotal about two fixed axes and a connecting rod connecting these two levers, and an elastic device which is connected to one of the levers and is supported at a fixed point; and two pairs of conjugate mechanical contact members, in each pair of mechanical contact members one of these contact members being provided on said driving member and the other contact member on the energy storing means in such positions that the contact members of one of the pairs of mechanical contact members only enter into contact when the contact members of the other pair cease to be in contact, these pairs of contact members being so adapted and arranged that at each instant they permit an exchange of power between said driving member and the energy storing means in one direction for one of the pairs of contact members and in the other direction for the other pair, the exchanges of power corresponding respectively to the excess and deficiency of the motive power relative to the power consumed at that instant.

10. Drive mechanism as claimed in claim 9, wherein one of the levers of the energy storing means carries one of the two contact members of the pair of contact members that permit an exchange fo power in the direction from said energy storing means to said driving member, and one of the contact members of the other pair of contact members is carried by one of the remaining two of said elements of the energy storing means.

11. Drive mechanism as claimed in claim 9, wherein the support point of the elastic device is adjustable in position.

12. Drive mechanism as claimed in claim 9, wherein one of the contact members of the pair of contact members that permit an exchange of power in the direction from said energy storing means to said driving member is constituted by an edge of one of said levers which forms a cam.

13. Drive mechanism as claimed in claim 12, wherein said levers and said connecting rod of said energy storing means are so arranged as to form a kind of pivotally assembled Z.

14. Drive mechanism as claimed in claim 13, wherein said pivotally assembled Z is so arranged that one of the contact members of the pair of contact members that permit an exchange of power in the direction from said driving member to said energy storing means is carried by this Z and remains constantly substantially situated in a plane containing the axis of rotation of said driving member and the axis of rotation of said lever that includes an edge in the form of a cam, said axes of rotation being parallel, said cam edge being located, at the start of the restoration of the stored energy, substantially in said plane so as to act substantially tangentially on said contact member carried by said driving member.

15. Drive mechanism as claimed in claim 9, wherein one of the contact members of the pair of contact members that permit an exchange of power in the direction from said energy storing means to said driving member is constituted by a cam carried and adjustable in position on one of said levers of said energy storing means.

16. Drive mechanism, which stores energy in the course of an operational cycle, for connecting to a motor furnishing a constant motive power a driven device that consumes power which varies in magnitude and passes, in the course of said cycle, through a peak value that is greater than said motive power, this drive mechanism comprising in combination: a rotative driving shaft operatively connected to said motor so that this shaft is given a uniform motion and is capable of transmitting a constant driving torque; a driven shaft operatively connected to the device to be driven; a connecting device comprising a Maltese cross operatively connected to said driven shaft and a driving pin carried by said driving shaft; energy storing means movable between a loaded position and an unloaded position, and two pairs of conjugate mechanical contact members, in each pair of contact members one of these contact members being provided on said driving shaft and the other contact member on said energy storing means in such positions that the contact members of one of the pairs of contact members only enter into contact when the contact members of the other pair of contact members cease to be in contact and these pairs of contact members being so adapted and arranged that at each instant they permit an exchange of power between said driving shaft and said energy storing means in one direction for one of the pairs of contact members and in the other direction for the other pair, the exchanges of power corresponding respectively to the excess and deficiency of the motive power relative to the power consumed at that instant, the exchange of power in the direction from said driving shaft to said energy storing means taking place during the time when said Maltese cross is stationary and the exchange of power in the direction from said energy storing means to said driving shaft taking place during the rotation of the Maltese cross.

17. Drive mechanism, which stores energy in the course of an operational cycle, for connecting to a motor furnishing a constant motive power a driven device that consumes power which varies in magnitude and passes, in the course of said cycle, through a peak value that is greater than said motive power, this drive mechanism comprising in combination: a rotative driving shaft operatively connected to said motor so that this shaft is given a uniform motion and is capable of transmitting a constant driving torque; a driven shaft operatively connected to the device to be driven; a Maltese cross operatively connected to said driven shaft; a pin integral with said driving shaft and adapted to drive the Maltese cross; energy storing means movable between a loaded position and an unloaded position and comprising two levers which are pivotal about fixed axes, a connecting rod connecting these two levers and an elastic device connected to one of these levers and supported at a fixed point; and two pairs of conjugate mechanical contact members, a first pair of contact members being constituted by a cam secured to said driving shaft and rotated by the latter and a roller carried by one of the two elements of said energy storing means consisting of said connecting rod and one of said levers, and the other pair of mechanical contact members being constituted by said pin which drives the Maltese cross and one of the edges of the other lever of said energy storing means which forms a cam, said contact members being in such positions that the contact members of the first pair of contact members only enter into contact when the Maltese cross is stationary and vice versa for the second pair of contact members whereby at each instant they permit an exchange of power between said driving shaft and said energy storing means in the direction from said driving shaft to said energy storing means in the case of said first pair of contact members and in the direction from said energy storing means to said driving shaft in the case of said second pair, the exchanges of power corresponding respectively to the excess and the deficiency of the motive power relative to the power consumed at that instant.

18. Drive mechanism as claimed in claim 17, wherein said lever of said energy storing means which has an edge that forms a cam is pivotally mounted on said driven shaft to which latter the Maltese cross is keyed.

19. Drive mechanism as claimed in claim 18, wherein the active portion of said cam is rectilinear and extends radially from the axis of rotation of said driven shaft.

20. Drive mechanism as claimed in claim 19, wherein said rectilinear portion is preceded by a portion in the shape of an arc of a circle which is concentric with said driving shaft at the moment said arced portion enters into contact with said pin that drives the Maltese cross.

21. Machine comprising in combination: a motor, a device to be driven and a drive mechanism according to claim 1, of which latter the driving member is operatively connected to said motor and the driven member is operatively connected to said device to be driven.

22. X-ray machine for large films, this machine comprising in combination: a motor, a device for driving said film and a drive mechanism according to claim 1, of which latter the driving member is operatively connected to said motor and the driven member is operatively connected to said device for driving the film.

23. X-ray machine for large films, this machine comprising in combination: a motor, a device for driving said film and a drive mechanism as claimed in claim 18, of which the driving member is operatively connected to said motor and the driven member is operatively connected to said device for driving the film.

References Cited in the file of this patent

UNITED STATES PATENTS

| | | |
|---|---|---|
| 1,168,086 | Maggard | Jan. 11, 1916 |
| 2,253,183 | Le Count | Aug. 19, 1941 |